United States Patent [19]

Fairchild et al.

[11] Patent Number: 5,733,953
[45] Date of Patent: Mar. 31, 1998

[54] LOW VISCOSITY, HIGH CONCENTRATION DRAG REDUCING AGENT AND METHOD THEREFOR

[75] Inventors: Keith Fairchild, Sand Springs; Robert Tipton, Tulsa; John F. Motier, Broken Arrow; Nagesh S. Kommareddi, Tulsa, all of Okla.

[73] Assignee: Baker Hughes Incorporated, Houston, Tex.

[21] Appl. No.: 496,489

[22] Filed: Jun. 29, 1995

[51] Int. Cl.$^6$ .............................. C08J 3/00; C08K 5/24; C08L 5/36; C08L 5/48
[52] U.S. Cl. ............... 523/336; 524/261; 524/282; 524/394
[58] Field of Search ............... 523/336; 524/261, 524/282, 394

[56] References Cited

U.S. PATENT DOCUMENTS

| | | | |
|---|---|---|---|
| 2,879,173 | 3/1959 | Yacoe | 117/16 |
| 3,692,676 | 9/1972 | Culter et al. | 252/8.55 R |
| 3,736,288 | 5/1973 | Stratta et al. | 260/33.4 R |
| 3,884,252 | 5/1975 | Kruka | 137/13 |
| 4,123,403 | 10/1978 | Warner et al. | 260/29.2 EP |
| 4,177,177 | 12/1979 | Vanderhoff et al. | 260/29.2 M |
| 4,212,312 | 7/1980 | Titus | 137/13 |
| 4,499,214 | 2/1985 | Sortwell | 523/336 |
| 4,510,304 | 4/1985 | Hadermann | 528/481 |
| 4,527,581 | 7/1985 | Motier | 137/13 |
| 4,584,244 | 4/1986 | Fenton | 428/407 |
| 4,720,397 | 1/1988 | O'Mara et al. | 427/180 |
| 4,826,728 | 5/1989 | O'Mara et al. | 428/407 |
| 4,837,249 | 6/1989 | O'Mara et al. | 523/175 |
| 4,845,178 | 7/1989 | Hostetler et al. | 526/153 |
| 5,165,440 | 11/1992 | Johnston | 137/13 |
| 5,244,937 | 9/1993 | Lee et al. | 523/204 |
| 5,376,697 | 12/1994 | Johnston et al. | 523/175 |
| 5,504,132 | 4/1996 | Smith et al. | 524/401 |
| 5,539,044 | 7/1996 | Dindi et al. | 524/570 |

FOREIGN PATENT DOCUMENTS 9500563  1/1995  WIPO.

*Primary Examiner*—Patrick Niland
*Attorney, Agent, or Firm*—Rosenblatt & Redano, P.C.

[57] ABSTRACT

Low viscosity, high concentration drag reducing agents may be prepared by slowly adding a liquid, non-solvent (e.g. isopropyl alcohol) for a drag reducing polymer (e.g. a polyalphaolefin) to a mixture of the polymer and the solvent (e.g. kerosene) in which the polymer is dissolved. When enough non-solvent is added, the polymer precipitates into fine particles. The supernatant mixture of solvent and non-solvent is then removed from the precipitated polymer slurry concentrate. Further solvent contained in the slurry concentrate may be removed by evaporation or further extraction with the liquid, non-solvent. The resulting slurry concentrate dissolves rapidly in flowing hydrocarbon streams to reduce the drag therein, and gives exceptionally good drag reducing results at low concentrations. Additionally, no injection probes or other special equipment is required to introduce the drag reducing slurry into the hydrocarbon stream, nor is grinding of the polymer necessary to form a suitable DRA slurry.

17 Claims, 3 Drawing Sheets

*LINE FILL OCCURS WHEN THE ENTIRE PIPELINE SECTION IS FULL OF DRA-TREATED FLUID.

LOW VISCOSITY, HIGH CONCENTRATION DRAG REDUCING AGENT AND METHOD THEREFOR

FIELD OF THE INVENTION

The invention relates to agents to be added to hydrocarbons flowing through a conduit to reduce the drag therethrough, and more particularly to drag reducing agents in the form of a non-ground polymer slurry.

BACKGROUND OF THE INVENTION

The use of polyalphaolefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries of ground polymers to form particulates. A problem generally experienced with simply grinding the polyalphaolefins (PAOs) is that the particles will "cold flow" or stick together after the passage of time, thus making it impossible to place the PAO in the hydrocarbon.

One common solution to preventing cold flow is to coat the ground polymer particles with an anti-agglomerating agent. Cryogenic grinding of the polymers to produce the particles prior to coating with an anti-agglomerating agent has also been used. However, powdered or particulate DRA slurries require special equipment for preparation, storage and injection into a conduit to ensure that the DRA is completely dissolved in the hydrocarbon stream.

Gel or solution DRAs have also been tried in the past. However, these drag reducing gels also demand specialized injection equipment, as well as pressurized delivery systems. They are also limited to about 10% polymer as a maximum concentration in a carrier fluid due to the high solution viscosity of these DRAs.

Thus, it would be desirable if a drag reducing agent could be developed which rapidly dissolves in the flowing hydrocarbon, which could minimize or eliminate the need for special equipment for preparation and incorporation into the hydrocarbon, and which could be formulated to contain much greater than 10% polymer.

SUMMARY OF THE INVENTION

Accordingly, it is an object of the present invention to provide a DRA that is not ground prior to use.

Other objects of the invention to provide a DRA that can be readily manufactured and which does not require special equipment for placement in a conduit transporting hydrocarbons.

In carrying out these and other objects of the invention, there is provided, in one form, a low viscosity, high concentration drag reducing agent (DRA) made by first (a) polymerizing a monomer or a mixture of monomers, such as an alphaolefin or mixture thereof in a solvent to form a polymer or copolymer in the solvent, and then (b) adding a liquid, non-solvent to the polymer in the solvent to give a mixture of polymer, solvent and non-solvent. The liquid, non-solvent is added at a rate to permit the polymer mixture to absorb the liquid, non-solvent to a point where the polymer precipitates into polymer particles of average diameter equal to or less than 0.10 inches (0.25 cm) and the viscosity of the mixture is reduced. Next, (c) the mixture is separated into a slurry concentrate of precipitated polymer particles and a supernatant layer of solvent and liquid, non-solvent, such as by drawing off or otherwise decanting the supernatant. Finally, (d) the residual solvent in the slurry concentrate of precipitated polymer particles is reduced by either (i) at least one additional extraction of at least a portion of the residual solvent by an additional quantity of liquid non-solvent, or (ii) evaporating some or all of the residual solvent to leave a slurry concentrate containing polymer particles in essentially only liquid, non-solvent.

DETAILED DESCRIPTION OF THE INVENTION

Figure 1:
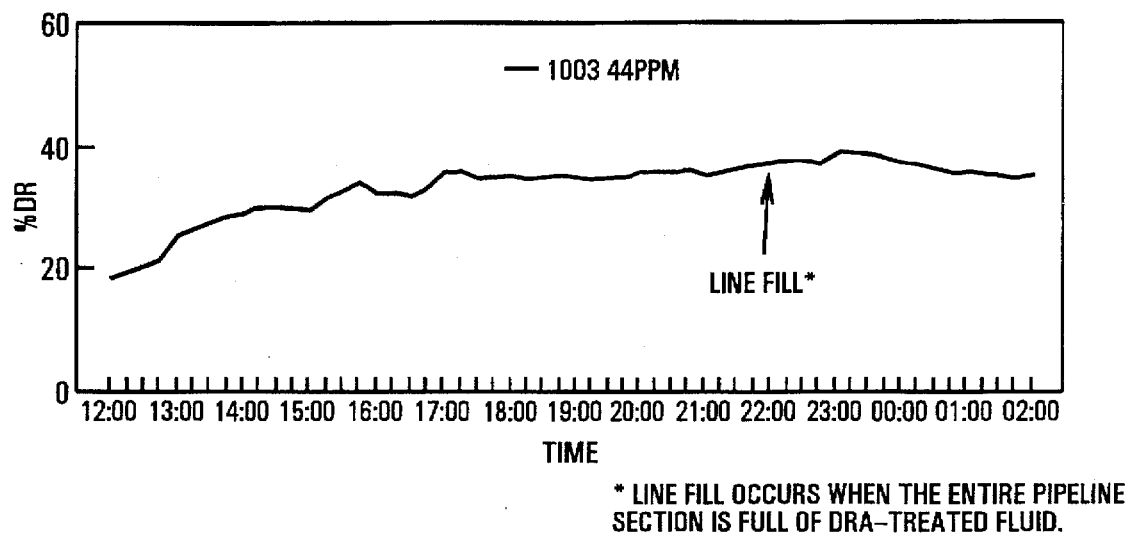
FIG. 1 is a chart of drag reduction effectiveness (DR %) as a function of time for FLO® 1003 drag reducing agent at 44 ppm for crude flowing through an Oklahoma pipeline.

It has been discovered that a low viscosity, high concentration drag reducing agent may be precipitated to form a useful slurry directly by carefully replacing the solvent in which the polymer is soluble with a liquid, nonsolvent for the polymer. The DRA slurry concentrate produced is readily soluble in a flowing hydrocarbon stream, and does not require the use of special equipment to inject it or otherwise deliver it into the stream.

In one embodiment of the invention, a high molecular weight polyalphaolefin (PAO) is polymerized from the monomer or monomers in a solvent for the α-olefin monomers. A suitable non-solvent for the PAO is slowly added to the neat drag reducer, which is simply the PAO in the solvent in which the polymerization occurs. The non-solvent must be added at a rate that will allow the drag reducer mixture to absorb the non-solvent. This rate depends on the amount of agitation in the mixing system used. If the rate of non-solvent addition is too high, it will make a precipitate that is not uniform in size with particles too large in size for use as a DRA in slurry form, and will contain undesirably high amounts of solvent. During the addition, the neat drag reducer will go through a viscosity reduction until the PAO precipitates. At this point, the mixture becomes a slurry concentrate of precipitated polymer particles overlaid by a supernatant layer of solvent and liquid, non-solvent. The weight ratio of liquid, non-solvent to solvent at this point may range from about 70/30 to 30/70, where, in one non-limiting, preferred embodiment, the ratio is about 50/50.

The slurry concentrate at this point will cold flow if not agitated. To reduce or prevent the cold flow, it will be necessary to remove at least 50% of the solvent/liquid, non-solvent mixture and replace it with additional non-solvent. This lowers the amount of solvent in the precipitated polymer. The mixture of solvent and liquid, non-solvent would again be separated or removed to concentrate the polymer proportion to at least 15 wt. %. Typically, the polymer will again settle if not agitated, but can be slurried again with further agitation. In one embodiment of the invention, the storage tanks for the DRA on site will have to be equipped with circulation pumps to keep the slurry mixed. In another embodiment, an anti-agglomeration agent may be added at this point. In an alternate embodiment of the invention, additional solvent may be removed from the slurry concentrate by evaporating, such as through vacuum drying or other technique.

It will be appreciated that the above-described preparation is analogous to a two-step extraction. However, since precipitation is also occurring in the first step, the rate of addition of the liquid, non-solvent must be carefully controlled. In one embodiment, the liquid, non-solvent is added to a point where the polymer precipitates into polymer particles of average diameter equal or less than 0.10" (0.25 cm). It is an advantage of this invention that the particle sizes average this small. In prior art practice, the DRA solution is added to a copious excess of non-solvent and the particle sizes typically average from about 1" (2.54 cm), see, for instance, Example 1 of U.S. Pat. No. 5,376,697.

It will be appreciated that the amount of DRA added to any particular hydrocarbon will vary greatly depending on a number of factors and cannot be specified in advance. For example, some of the parameters affecting the proportion of DRA to be added include, but are not limited to, the chemical nature of the hydrocarbon being transported, the temperature of the hydrocarbon being transported, the viscosity characteristics of the hydrocarbon, the ambient temperature of the pipeline environment, the nature of the DRA itself, etc. However, in some cases, the amount of DRA injected into the flowing hydrocarbon stream ranges from about 3 to about 100 ppm, or higher; preferably from about 3 to about 50 ppm.

Polymerization

The monomers useful in the preparation of the slurry concentrates of this invention may be any alphaolefin having from about four to about sixteen carbon atoms. Of course, mixtures of alphaolefins can be used. Indeed, mixtures of monomers to make copolymers are often preferred. It will be understood in the description and claims of the invention that polymerizing at least one monomer to form a polymer encompasses polymerizing only one monomer type to make a homopolymer as well as more than one monomer to make a copolymer; that is, it will be understood that the term "polymer" encompasses "copolymer" products as well. Suitable solvents for polymerizing the alphaolefins include, but are not necessarily limited to kerosene, jet fuel, paraffinic and isoparaffinic solvents. The polyalphaolefins are polymerized from the monomers or comonomers by conventional techniques and will have molecular weights above 10 million per analysis by gel permeation chromatography (GPC). Polyalphaolefins particularly suitable for the processes and compositions of this invention include the FLO® family of PAO DRAs, including FLO® 1004, FLO® 1005, FLO® 1008, FLO® 1010, FLO® 1012, FLO® 1020 and FLO® 1022 DRAs sold by Baker Pipeline Products, a division of Baker Performance Chemicals, Inc.

In the method of this invention, the amount of polymer in the solvent may range from about 1 wt. % to about 20 wt. %. In one embodiment, preferably the amount of polymer in the solvent ranges from about 3 wt. % to about 10 wt. %.

Precipitation of Polymer

As noted, a liquid, non-solvent is slowly added to the polymer in a solvent at a rate to permit the polymer mixture to absorb the liquid, non-solvent. This rate will vary with the mixing equipment available, and to some extent with the specific polymer, solvent, and liquid non-solvent employed. The addition of non-solvent proceeds until the polymer precipitates into polymer particles of average diameter of 0.10" (0.25 cm) or less and the viscosity of the mixture decreases, in one embodiment. Again, this point will vary from system to system.

While the process conditions for the non-solvent addition and polymer precipitation may be ambient temperature and pressure, other conditions outside of ambient are anticipated as being useful. Of course, temperatures and pressures above and below ambient would affect the point at which precipitation took place, as well as the solubility characteristics of the various systems.

Suitable liquid, non-solvents for PAOs include, but are not necessarily limited to isopropyl alcohol (IPA), other alcohols, glycols, glycol ethers, ketones, esters, all of which contain from 2 to 6 carbon atoms. The weight ratio of non-solvent to solvent after the addition of the non-solvent may range from about 70/30 to about 30/70, preferably from about 60/40 to about 40/60, and in one embodiment is especially preferred to be about 50/50. In other words, in one embodiment, at least 40 wt. % of the solvent is replaced with the liquid, non-solvent.

Separation of Slurry Concentrate from Supernatant

After precipitation of the polymer is complete, the slurry concentrate of precipitated polymer particles is separated from the supernatant layer of solvent and liquid, non-solvent. This may be conducted by any available, conventional technique, such as decanting, cyclone separation, filtration, centrifugation or otherwise separating the supernatant layer, etc.

Further Reduction of Solvent Content

It is expected that to produce useful product that is easily handled, the residual solvent in the slurry concentrate of precipitated polymer particles must be further removed or reduced, preferably as much as possible. This can be done with an additional extraction-like step by adding additional non-solvent, and then further removing the formed liquid mixture. Solvent may also be evaporated to leave a slurry further concentrated containing polymer particles in predominantly liquid, non-solvent. By predominantly liquid, non-solvent is meant that the slurry concentrate contains less than 10 wt. % solvent based on the total slurry concentrate.

In one embodiment of the invention, the final slurry concentrate of precipitated polymer particles may contain from about 5 wt. % to about 50 wt. % polymer. In another embodiment, it is preferred that the slurry contain from about 15 wt. % to about 35 wt. % polymer.

Optional Anti-agglomeration Agents

It is expected that many slurry concentrates prepared according to the process of this invention will not require the addition of an optional anti-agglomeration agent to reduce or prevent the tendency of the DRA to cold flow upon settling. However, in other cases it may be desirable to add an anti-agglomeration agent before, during or after all of the solvent replacement efforts are made. That is, the anti-agglomeration agent may be added at any point during the process of this invention, except during the polymerization.

In one embodiment, the weight of the anti-agglomeration agent added to the slurry concentrate is approximately equal to or less than the weight of the polymer in the slurry concentrate. In another embodiment, it is preferred that the amount of anti-agglomeration agent range from about 75% to about 25% of the weight of polymer in the slurry concentrate. Suitable anti-agglomeration agents include, but are not limited to, salts of fatty acids having 12–20 carbon atoms, specifically alkali earth metal salts of such acids, which may include, but are not limited to, magnesium stearate and calcium stearate; as well as silicones.

The invention will be demonstrated further with reference to the following Examples which are meant only to additionally illustrate the invention and not limit it.

EXAMPLE 1

The slurry concentrate of Example 1 was made with the following equipment:

500 gallon (1,872 l) tank

Viking Gear pump, ~20 g.p.m. (75.7 l/min.) to circulate through a 2" (5.1 cm) line Agitator inserted from top of tank.

Static mixer in the recirculation line from the bottom of tank to top.

One hundred, fifty gallons of FLO® 1012 alphaolefin polymer (with kerosene solvent) having a solids content of 6.2% was metered into the tank. FLO 1012 is a proprietary copolymer of alphaolefins within the range of $C_4$–$C_{12}$.

A total of 140 gallons (526.2 l) of IPA was added gradually to the batch over a period of 6 hours, and then the circulation pump and agitator were turned off and the material settled. The precipitate was pumped into a 640 gallon (2,405 l) tank and the IPA/kerosene supernatant was pumped into a waste tank. After the IPA/kerosene was pumped out of the 500 gallon (1,872 l) tank, the precipitate was pumped back into this tank and 140 more gallons (526.2 l) of IPA was added to the batch of slurry concentrate to extract more kerosene from the slurry.

The precipitated polymer slurry concentrate mixed with fresh IPA was pumped to the 640 gallon (2,405 l) tank. The slurry concentrate product was 116 gallons (436 l) having 8 wt. % solids. The % drag reduction (DR) measured on a ¼" diameter steel tubing test loop at a concentration of 0.5 ppm slurry was 18%. This result indicated that the polymer was shear degraded, most likely from the Viking Gear pump. It was also noted that the precipitated polymer was sticking together, or exhibiting cold flow.

EXAMPLE 2

The Viking Gear pump of the equipment used in Example 2 was modified by adding a variable speed drive to the motor. This change would allow the pump to pump slower and would thus produce less shear.

The batch was made following the same addition rates as Example 1 as closely as possible. The only difference was slowing the speed of the pump from 250 rpm to 126 rpm. Also, the separation/washes were performed somewhat differently, as will be described.

In this Example, the IPA/kerosene supernatant was removed from the top of the tank after letting the precipitate settle to the bottom. This step was performed by closing the tank's bottom valve and using the suction of the pump with a flex hose over the top through the man way. The result was a better separation, and reduced loss of precipitated polymer.

In Example 2, the IPA/kerosene supernatant was removed and about 200 gallons (752 l) of fresh IPA was added, and then the supernatant was removed again. Afterwards, the slurry concentrate was pumped into a clean 640 gallon (2,405 l) tank. The final amount of the slurry concentrate was 66 gallons (248 l) having 13.6% solids. The DR at a 0.5 ppm proportion of slurry was 25.0%. This batch cold flowed into larger particles within 24 hours.

EXAMPLE 3

The product of Example 2 demonstrated that the precipitated slurry concentrate could be made without degrading the polymer. In an effort to decrease batch time, a Moyno Pump was installed along with a 3" (7.62 cm) pipe in the circulation system that had three discharge points into the top of the tank that would help improve the mixture of the polymer/IPA solutions. The variable speed drive was moved to the agitator to try to make it more useful.

In Example 3, the basic addition of IPA into the FLO 1012 material was the same as Examples 1 and 2, and the batch time was reduced by 25%. That is, it took about 4.5 hours to precipitate the 150 gallons (564 l) of FLO 1012. The wash amount was increased to 250 gallons (940 l) and an extra wash was added and allowed to mix overnight. The purpose of this procedure was to see if efforts to remove more kerosene would improve or prevent the cold flow.

Example 3 produced 46 gallons (173 l) of slurry concentrate (polymer and IPA) at 20 wt. % solids, which gave a DR of 29.0% at 0.5 ppm dosage. This material also cold flowed into larger particles within 24 hours.

EXAMPLE 4

The slurry concentrate of Example 4 was made the same way as that of Example 3, except that the initial polymer/solvent was FLO® 1010 at 13 wt. % solids. FLO® 1010 is a proprietary α-olefin copolymer from within the range of $C_4$–$C_{12}$. The polymer precipitated the same as before, but had a low DR of 18% at 0.5 ppm slurry proportion. The Example 4 material also cold flowed.

EXAMPLES 5–11

In these Examples, magnesium stearate was added as an anti-agglomeration agent. The only difference in the precipitation process from Examples 3 and 4 was the addition of magnesium stearate after the last wash to remove the kerosene solvent.

In Example 5, which used the same FLO 1012 as in Example 3, the amount of magnesium stearate added was 10 wt. % based on the weight of the polymer, absent the weight of the non-solvent. Thus, for 150 gallons (564 l) of slurry concentrate at 6.2 wt. % solids, 6.1 lbs (2.77 kg) of magnesium stearate was added.

Samples of the Example 5 material did not show cold flow tendencies, but when samples of Example 5 material had extra magnesium stearate added beyond that described above, it lowered the viscosity of the sample. It was determined in the future to add 15 wt. % magnesium stearate. Examples 6 through 11 were thus made with 15 wt. % magnesium stearate added after the last wash with IPA.

EXAMPLES 12–16

A sample of material from the combined batches from Examples 5–11 (Ex. 5–11) was tried in a DR test in a hydrocarbon pipeline in Oklahoma.

Pipeline Data

The pipeline test section was about 24 miles (38.4 km) long, with an outer diameter of 10.75" (27.3 cm). The elevation at the beginning was 769 ft. (235 m), while the elevation at the end was 747 ft. (228 m). The mainline pumps were 4 positive displacement pumps with a total output of 1300 bph (206,700 l/h). Density of the crude ranged from 38° to 41° API (specific gravities of 0.83–0.82). The measured viscosity was 8 cSt at 65° F. (18° C.). Pour point of the crude ranged from 0° F. (−18° C.) to −20° F. (−29° C.). Percent wax was unknown. Percent water was less than 0.1%. Reynolds number 60,425. Velocity was 3.81 fps (1.16 m/s).

Test Data

Figure 5:
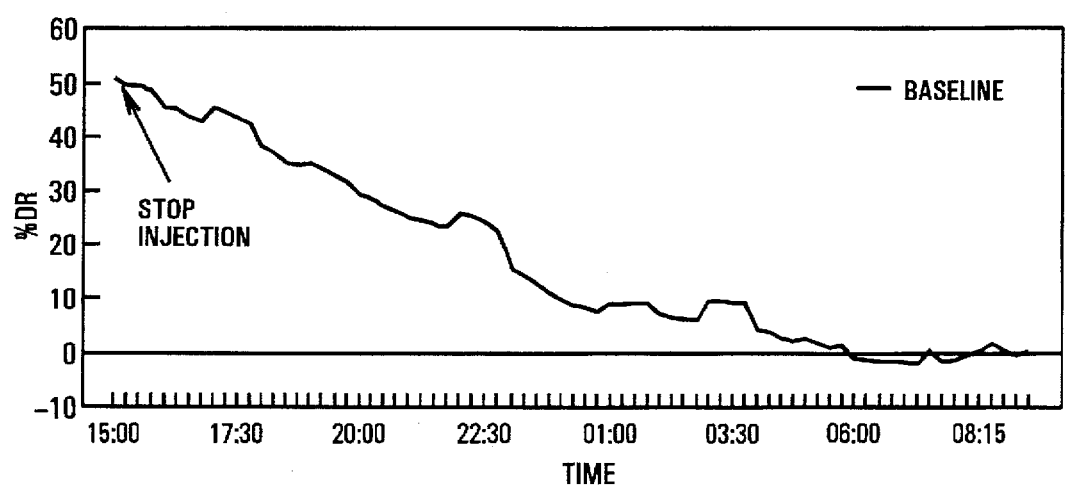
FIG. 5 is a chart of baseline DR % as a function of time for crude flowing through the same pipeline with no drag reducing agent present.

The test began with the collection of baseline data using data loggers at the discharge of each end of the pipeline. The baseline data was also collected after all of the injections were performed, and this data is graphed as FIG. 5. The test protocol was to inject 2 concentrations of FLO 1003, followed by 2 concentrations of the Ex. 5–11 material.

Figure 2:
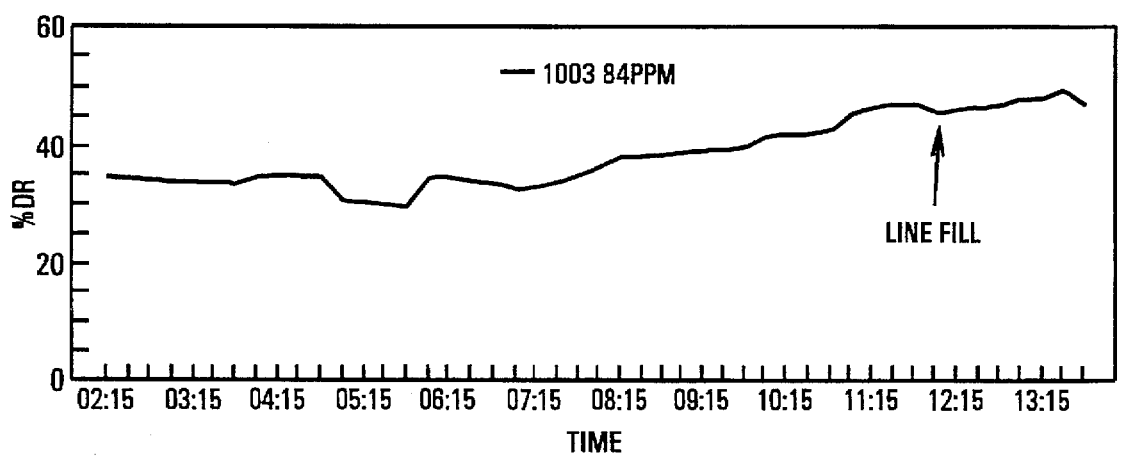
FIG. 2 is a chart of DR % as a function of time for FLO® 1003 drag reducing agent at 84 ppm for crude flowing through the same pipeline.

FLO 1003 is a high viscosity, gel-like solution with 8.1 wt. % solids. FIGS. 1 and 2 give the results for injection of FLO 1003 at 44 ppm and 84 ppm, respectively, using an injection probe with a spaghetti die configuration. FIG. 1 illustrates the average result of 36.5% drag reduction±0.85 at 95% level of confidence (t-distribution; same level of confidence for all data). FIG. 2 demonstrated an average result of 47.0% drag reduction ±1.1. Line fill refers the point at which the entire pipeline section is full of DRA treated fluid.

Prior to the injection of the inventive Ex. 5–11 material, the system was freed of any gel material. The injection probe was removed. A pump injected the Ex. 5–11 material for 24 hours (the duration of the testing period) with no problems. The Ex. 5–11 product is a polymer slurry, with 30.0 wt. % solids: 12 wt. % is magnesium stearate anti-agglomeration agent while 18 wt. % is polymer.

Figure 3:
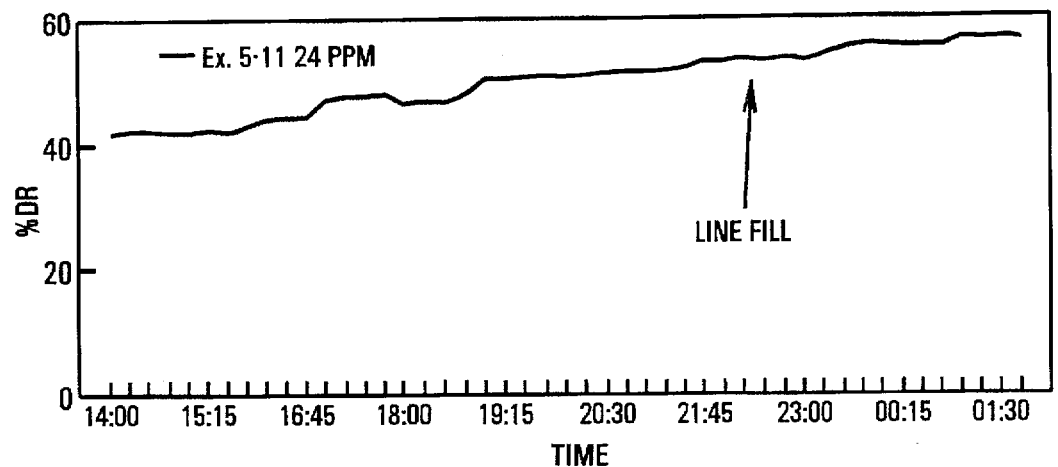
FIG. 3 is a chart of DR % as a function of time for the inventive drag reducing agent blend from Examples 5–11 at 24 ppm for crude flowing through the same pipeline.
Figure 4:
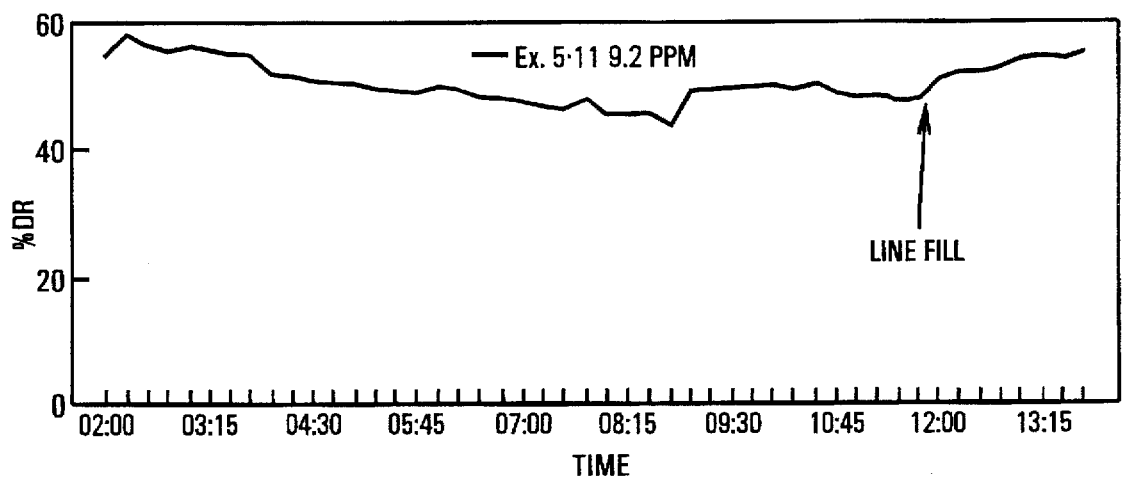
FIG. 4 is a chart of DR % as a function of time for the inventive drag reducing agent blend from Examples 5–11 at 9.2 ppm for crude flowing through the same pipeline.

FIG. 3 shows that for injection of the Ex. 5–11 material at 24 ppm, the average result is 55.7% DR ±0.43. FIG. 4 illustrates for injection of the inventive Ex. 5–11 material at only 9.2 ppm, the average resulting DR was 53.0% ±0.91.

EXAMPLE 12

The precipitation process of the invention was also carried out in a Ross double planetary mixer. Twenty parts by volume of a 6% solution of FLO 1012 in kerosene was charged to the mixer. In a separate vessel, 0.9 parts of magnesium stearate was slurried in 25 parts of IPA. The magnesium stearate/alcohol slurry was added in one part increments to the copolymer solution with agitation over a six hour period. Each incremental addition of slurry was completely blended into the copolymer solution before additional slurry was added. Agitation was continued for one hour after the last increment of slurry was added. This procedure produced a finely divided polyolefin precipitate which was allowed to settle out over a 12 hour period. The supernatant was then decanted and 20 parts IPA were added to the precipitate followed by 1 hour of agitation. The polymer precipitate was allowed to settle and the supernatant removed to achieve the desired polymer slurry concentrate.

EXAMPLE 13

The inventive precipitation process was further carried out in a variable speed turbine agitator-equipped blend tank which had a circulation loop equipped with a progressive cavity positive displacement pump. To 175 parts of a 6% solution of FLO 1012 copolymer in kerosene was added gradually over a six hour period a slurry containing 8 parts of magnesium stearate and 212 parts of IPA. The blender contents were agitated and circulated during the addition of the slurry and for one hour after the precipitation step. The precipitated polyolefin was allowed to settle out over a 12 hour period. The supernatant was decanted and 175 parts of IPA were added to the precipitate followed by 1 hour of agitation and circulation. The polymer precipitate was allowed to settle and the supernatant removed to achieve the desired polymer slurry concentrate.

The slurry concentrates from Exs. 12 and 13 have been tested as DRAs in a 2" test loop. They rapidly dissolved in the hydrocarbon and were very effective in reducing drag.

The inventive polymer slurry concentrates have been demonstrated to have the advantages of quick dissolution in flowing crude, injection therein without the benefit of injection probes or other specialized equipment and did not require prior grinding of the polymer. Further, the inventive slurry concentrates give exceptionally good drag reducing results at low concentrations. Many modifications may be made in the composition and implementation of this invention without departing from the spirit and scope thereof which are defined only in the appended claims. For example, the exact combination of DRA polymer, solvent and liquid, non-solvent, and optional anti-agglomeration agent may be different from those used here.

We claim:

1. A low viscosity, high concentration drag reducing agent (DRA) slurry directly made by the process comprising:
   (a) polymerizing at least one monomer in a solvent to form a polymer in the solvent;
   (b) adding a liquid, non-solvent to the polymer in the solvent to give a mixture of polymer, solvent and non-solvent, at a rate to permit the polymer mixture to absorb the liquid, non-solvent to a point where the polymer precipitates into polymer particles of average diameter equal to or less than 0.10 inches (0.25 cm) and the viscosity of the mixture is reduced;
   (c) separating a slurry concentrate of precipitated polymer particles from a supernatant layer of solvent and liquid, non-solvent; and
   (d) reducing the residual solvent in the slurry concentrate of precipitated polymer particles by a process selected from the group of processes consisting of:
      (i) at least one additional extracting of at least a portion of the residual solvent by additional liquid non-solvent, and
      (ii) evaporating at least a portion of the residual solvent to leave a slurry concentrate containing polymer particles in predominantly liquid, non-solvent to produce a slurry directly usable as a DRA in the absence of a polymer grinding step.

2. The DRA of claim 1 where the at least one monomer is an alpha-olefin and the polymer is a polyalphaolefin.

3. The DRA of claim 1 where in the process in step (b), the weight ratio of non-solvent to solvent after the addition of the non-solvent is about 70/30 to about 30/70.

4. The DRA of claim 1 where in the process in step (a), the amount of polymer in the solvent ranges from about 1 wt. % to about 20 wt. %, and where in step (d) the slurry concentrate of precipitated polymer particles contains from about 5 wt. % to about 50 wt. % polymer.

5. The DRA of claim 1 where in the process further comprises adding an anti-agglomeration agent to the polymer in any of steps (b)–(d), where the anti-agglomeration agent is selected from the group consisting of salts of fatty acids having 12–20 carbon atoms and silicones.

6. The DRA of claim 5, where the weight of the anti-agglomeration agent added to the polymer is approximately equal to or less than the weight of the polymer.

7. A low viscosity, high concentration drag reducing agent (DRA) slurry directly made by the process comprising:
   (a) polymerizing at least one monomer in a solvent to form a polymer in the solvent;
   (b) adding a liquid, non-solvent to the polymer in the solvent to give a mixture of polymer, solvent and non-solvent, at a rate to permit the polymer mixture to absorb the liquid, non-solvent;
   (c) replacing at least 40 wt. % of the solvent with the non-solvent to provide a non-solvent-rich mixture; and
   (d) drying the non-solvent-rich mixture to remove at least 50 wt. % of the solvent present to produce a non-agglomerating a slurry concentrate of polymer particles directly useful as the DRA in the absence of a polymer grinding step.

8. The DRA of claim 7 where the at least one monomer is an alpha-olefin and the polymer is a polyalphaolefin.

9. The DRA of claim 7 where in the process in step (b), the weight ratio of non-solvent to solvent after the addition of the non-solvent is about 70/30 to about 30/70.

10. The DRA of claim 7 where in the process in step (a), the amount of polymer in the solvent ranges from about 1 wt. % to about 20 wt. %, and where in step (d) the slurry concentrate of polymer particles contains from about 5 wt. % to about 50 wt. % polymer.

11. The DRA of claim 7 where in the process further comprises adding an anti-agglomeration agent to the polymer in any of steps (b)–(d), where the anti-agglomeration agent is selected from the group consisting of salts of fatty acids having 1–20 carbon atoms and silicones.

12. A direct process for making low viscosity, high concentration drag reducing agent (DRA) slurry comprising:
   (a) polymerizing at least one monomer in a solvent to form a polymer in the solvent;
   (b) adding a liquid, non-solvent to the polymer in the solvent to give a mixture of polymer, solvent and non-solvent, at a rate to permit the polymer mixture to absorb the liquid, non-solvent to a point where the polymer precipitates into polymer particles of average diameter equal to or less than 0.1 inches (0.25 cm) and the viscosity of the mixture is reduced;
   (c) separating a slurry concentrate of precipitated polymer particles from a supernatant layer of solvent and liquid, non-solvent; and
   (d) reducing the residual solvent in the slurry concentrate of precipitated polymer particles by a process selected from the group of processes consisting of:
      (i) at least one additional extracting of at least a portion of the residual solvent by additional liquid non-solvent, and
      (ii) evaporating at least a portion of the residual solvent to leave a slurry concentrate containing polymer particles in predominantly liquid, non-solvent
   (e) producing a slurry directly usable as a DRA in the absence of a polymer grinding step.

13. The process of claim 12 where in step (a) the at least one monomer is an alpha-olefin and the polymer is a polyalphaolefin.

14. The process of claim 12 where in step (b), the weight ratio of non-solvent to solvent after the addition of the non-solvent is about 70/30 to about 30/70.

15. The process of claim 12 where in step (a), the amount of polymer in the solvent ranges from about 1 wt. % to about 20 wt. %, and where in step (d) the slurry concentrate of precipitated polymer particles contains from about 5 wt. % to about 50 wt. % polymer.

16. The process of claim 12 where in the process further comprises adding an anti-agglomeration agent to the polymer in any of steps (b)–(d), where the anti-agglomeration agent is selected from the group consisting of salts of fatty acids having 12–20 carbon atoms and silicones.

17. The process of claim 16, where the weight of the anti-agglomeration agent added to the polymer is approximately equal to or less than the weight of the polymer.

* * * * *